United States Patent [19]
Ono et al.

[11] Patent Number: 4,892,351
[45] Date of Patent: Jan. 9, 1990

[54] WATER DRAIN TROUGH FOR AUTOMOTIVE SUNROOF

[75] Inventors: Jun Ono; Yuichiro Iso; Hiroshi Ise, all of Saitama, Japan

[73] Assignee: Honda Giken Kogyo K.K., Japan

[21] Appl. No.: 159,082

[22] Filed: Feb. 23, 1988

[30] Foreign Application Priority Data

Mar. 13, 1987 [JP] Japan .................... 62-058081
Jun. 9, 1987 [JP] Japan .................... 62-143638

[51] Int. Cl.$^4$ ............... B60J 7/195; B60R 13/07
[52] U.S. Cl. .................... 296/213; 296/216; 296/208; 220/403; 49/476
[58] Field of Search ........... 296/208, 213, 216, 221, 296/222, 154; 49/476, 482; 220/403

[56] References Cited

U.S. PATENT DOCUMENTS

| | | | |
|---|---|---|---|
| 2,815,887 | 12/1957 | Ford et al. | 220/403 X |
| 3,016,263 | 1/1962 | Rehmann | 296/222 |
| 3,570,705 | 3/1971 | Kassravi | 220/403 |
| 3,738,670 | 6/1973 | Jelinek et al. | 49/482 X |
| 4,190,988 | 3/1980 | Carreiro | 52/11 X |
| 4,398,915 | 1/1983 | Torii | 296/213 |
| 4,463,983 | 8/1984 | Hellriegel | 296/213 |
| 4,671,565 | 6/1987 | Grimm et al. | 296/222 X |
| 4,729,593 | 3/1988 | Nisiguchi et al. | 296/213 X |
| 4,749,225 | 6/1988 | Fuerst et al. | 296/216 |

FOREIGN PATENT DOCUMENTS

| | | | |
|---|---|---|---|
| 58-27851 | 6/1983 | Japan . | |
| 213517 | 12/1984 | Japan | 296/213 |
| 2039839 | 8/1980 | United Kingdom | 296/222 |

*Primary Examiner*—Dennis H. Pedder
*Attorney, Agent, or Firm*—Skjerven, Morrill, MacPherson, Franklin & Friel

[57] ABSTRACT

In a sunroof structure having an opening provided in a roof panel of an automobile, a sunroof panel which can move between a first position for closing the opening and a second position for exposing the opening, a sunroof base panel supporting a mechanism for achieving the motion of the sunroof panel, and a water drain trough defined along a peripheral region of the opening, the water drain trough is defined by a trough member having a substantially U-shaped cross section extending along the peripheral region of the opening and resting upon an inner surface of an outer wall of the sunroof base panel and an outer surface of a guide rail for the sunroof panel. Preferably, the trough member consists of an extension of a seal member which is interposed between a lower surface of the roof panel and an upper most edge of the outer wall of the sunroof base panel. Thus, the trough member is not required to be rigid and the assembly work is simplified. Further, the structural and mechanical parts of the sunroof structure are protected from rust. Additionally, since the sunroof base panel is not required to be depressed to define the trough, the head clearance of the passenger compartment can be increased without increasing the overall height of the automobile.

10 Claims, 4 Drawing Sheets

WATER DRAIN TROUGH FOR AUTOMOTIVE SUNROOF

TECHNICAL FIELD

The present invention relates to an automotive sunroof structure which, provided in the roof of an automobile, can be opened as desired by a sliding motion or a tilting motion of a sunroof panel. The sunroof panel may be either transparent or non-transparent. In particular, the present invention relates to an improved water drain structure for an automotive sunroof structure of this type.

BACKGROUND OF THE INVENTION

Generally, an automotive sunroof structure comprises an opening provided in the roof of the automobile, a sunroof panel made of either glass or steel plate for closing this opening, and a mechanism for moving the sunroof panel between a retracted or open position and a closed position either by a sliding motion or a tilting motion of the sunroof panel. The mechanism may be driven either manually or by an external power source such as an electric motor. In such a sunroof assembly, the sunroof panel is provided with a seal structure which, when the sunroof is closed, keeps off rain water and so on from the passenger compartment but is additionally provided with a trough which extends along the edge of the roof panel opening and receives water which has passed through the seal structure. This trough is connected to drain hoses which are typically connected to the bottom parts of the corners of the trough.

Conventionally, this trough was provided by press forming a sunroof base panel which supports guide rails and other mechanical parts for accomplishing the motion of the sunroof panel, for instance, as shown in Japanese Utility Model Publication No. 58-27851. Thus, the peripheral fringe of the sunroof base panel is provided with a main part supporting the mechanical parts for moving the sunroof panel, a trough which is depressed in relation with the main part, and an outer upright wall which defines the outer periphery of the trough.

A sunroof panel of this structure is, however, known to have a number of problems. First, the connection between a corner portion of the trough and a drain hose is accomplished by a tube member which is attached to the corner portion of the trough by means of brazing. This brazing process itself and the subsequent finishing processes applied to the brazed part for preventing the rusting thereof and inspecting the soundness of the brazed part significantly increase the manufacturing cost.

Furthermore, since the trough is depressed from the main part of the sunroof base panel, it reduces the head clearance of the passenger compartment when the vehicle height is to remain the same.

BRIEF SUMMARY OF THE INVENTION

In view of such and other problems of the prior art, a primary object of the present invention is to provide a water drain trough for an automotive sunroof which is economical to manufacture.

A second object of the present invention is to provide a sunroof water drain trough which is free from rust.

A third object of the present invention is to provide a sunroof water drain trough which does not reduce the head clearance of the passenger compartment.

These and other objects of the present invention can be accomplished by providing that, in a sunroof structure having an opening provided in a roof panel of an automobile, a sunroof panel which can move between a first position for closing the opening and a second position for exposing the opening, a sunroof base panel supporting a mechanism for achieving the motion of the sunroof panel, and a water drain trough defined along a peripheral region of the opening, the water drain trough is defined by a trough member having a substantially U-shaped cross section extending along the peripheral region of the opening and resting upon an inner surface of an outer wall of the sunroof base panel and an outer surface of a guide rail for the sunroof panel.

Thus, the trough member is not required to be rigid and the assembly work is simplified and the structural and mechanical parts of the sunroof structure are protected from rust. Additionally, since the sunroof panel is not required to be depressed to define the trough, the head clearance of the passenger compartment can be increased without increasing the overall height of the automobile.

According to a preferred embodiment of the present invention, a seal member is interposed between a lower surface of the roof panel and an upper most edge of the outer wall and the trough member consisting of an extension of the seal member. According to this embodiment, the seal member along with the extension thereof can be conveniently made by extruding synthetic resin material and the manufacturing of the trough member and the assembling of the trough member to the sunroof base panel are both simplified.

According another preferred embodiment of the present invention, the extension of the seal member serving as the trough member is provided with a pleated portion for accommodating a difference in a dimension of the trough member along the water drain trough. The seal member may consist of a one-piece member made by extrusion or multi-piece member comprising straight portions and corner portions which are joined together by bonding means.

BRIEF DESCRIPTION OF THE DRAWINGS

The present invention will now be shown and described in the following in terms of concrete embodiments thereof with reference to the appended drawings, in which.

DETAILED DESCRIPTION OF THE PREFERRED EMBODIMENTS

Figure 1:
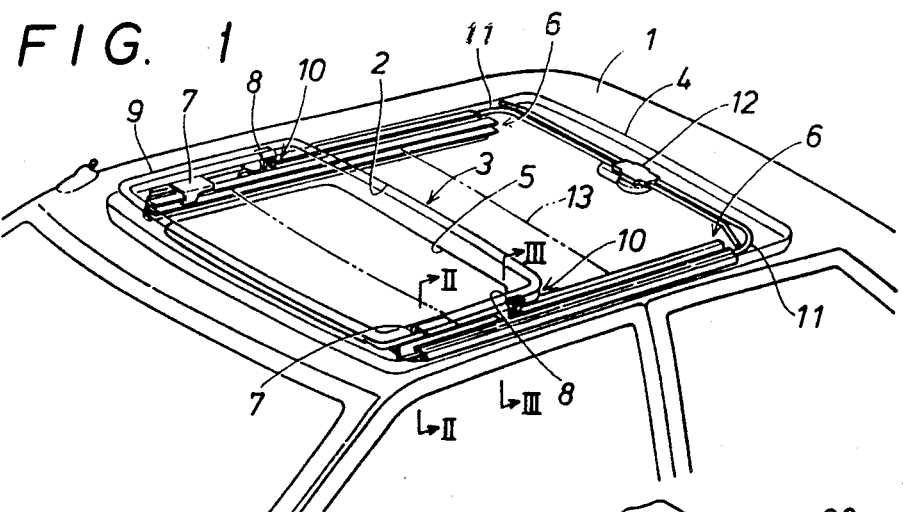
FIG. 1 is an overall see-through perspective view of an automotive sunroof structure to which the present invention is applied.

FIG. 1 is a see-through perspective view of an automotive sunroof assembly which comprises an opening 2 provided in the roof panel 1 of an automobile, and a sunroof panel 3 consisting of a glass panel which selectively covers the opening 2 as described hereinafter. The sunroof assembly further comprises a sunroof base panel 4 which is securely attached to the lower surface of the roof panel 1 at a certain distance therefrom. The sunroof base panel 4 is provided with an opening 5 which corresponds to the opening 2 of the roof panel 1 and a pair of guide rails 6 extending on either side of the opening 5 along the longitudinal direction of the automobile.

The glass panel 3 is provided with four stays 7 and 8 on its lower surface, two on either side of a front part thereof and two on either side of a rear part thereof. The glass panel 3 is guided along the guide rails 6 by way of these stays 7 and 8 between an open position and a closed position. The peripheral edge of the glass panel 3 is provided with a weather strip 9 having a sealing capability so that the glass panel 3 can close the opening 2 in the roof panel 1 in substantially water tight manner.

The rear stays 8 are connected to the free ends of a pair of push-pull cables 11 by way of link mechanisms 10. Each of the push-pull cables 11 extends rearward from the corresponding link mechanism 10 and bends inwardly adjacent to the rear end of the sunroof base panel 4 before it meshes with a drive gear which is in turn driven by an electric motor 12 provided in a central part of the rear end of the sunroof base panel 4. When this electric motor 12 is turned, the push-pull cable 11 is accordingly pushed or pulled depending on the direction of the rotation of the electric motor 12 so as to move the glass panel 3 along the guide rails 6 between a retracted or open position in which the glass panel 3 is stowed in a space between the roof panel 1 and the sunroof base panel 4 behind the openings 2 and 5 and a closed position in which the glass panel 3 is fitted into the opening 2 of the roof panel 1. Additionally, a sunshade 13 is provided between the glass panel 2 and the sunroof base panel 4 in a slidable manner along the longitudinal direction of the automobile body so that the sunlight through the glass panel 3 may be shut off as desired.

Figure 2:
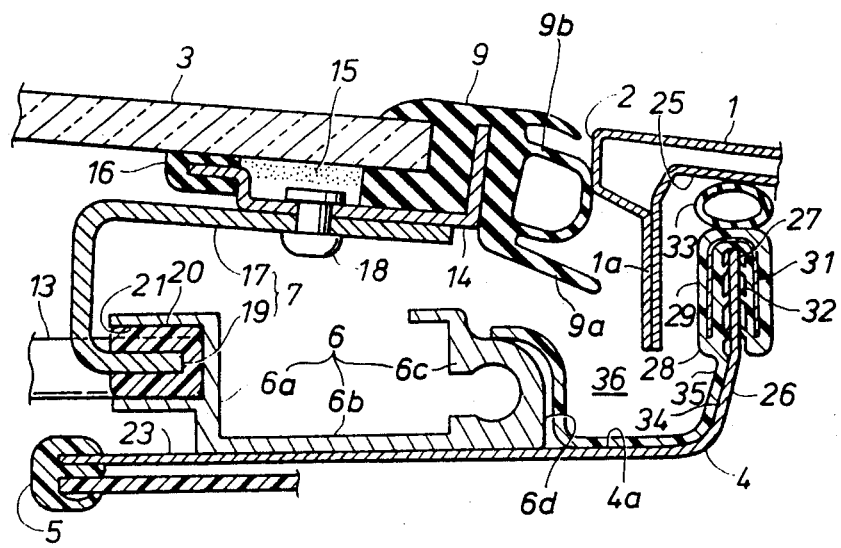
FIG. 2 is a sectional view taken along line II—II of FIG. 1.

FIG. 2 is a sectional view taken along line II—II of FIG. 1 and shows a relatively forward part of a side portion of the sunroof base panel 4. As best shown in FIG. 2, the glass panel 3 is fitted into a frame 14 by way of a weather strip 9 and a bonding agent 15. The inner edge of the frame 14 is covered by a mold member 16 made of synthetic resin material. The weather strip 9 is provided with a tubular portion 9b which elastically abuts the inner peripheral surface of the opening 2 in the roof panel 1, and an extension 9a extending obliquely downwardly and outwardly.

Each of the base ends 17 of the front stays 7 extending substantially horizontally is attached to the lower surface of the frame 14 by means of rivets 18. Each of the front stays 7 is bent downwards at the internal end of the horizontal base end 17 and is then bent again outwards, thereby defining a substantially horizontal free end 19. The outer most end of the free end 19 is covered with a slider member 20 having a favorable frictional property and is slidably received in a guide groove 21 formed in an upright portion 6a of the guide rail 6 having a C-shaped cross section and being provided at the inner most part of the guide rail 6 so that the front stay 7, along with the glass panel 3 may be guided along the longitudinal direction of the automobile.

The guide groove 21 further receives one of the two side edges of the sunshade 13. As can be seen by combining FIGS. 2 and 3, this sunshade 13 is guided by the guide grooves 21 provided in the guide rails 6 which are in turn provided along either side end of the opening 2 of the roof panel 1, so as to be manually slidable along the longitudinal direction of the automobile. However, only when the glass panel 3 is slid open rearward by the motor 12 while the sunshade 13 is closed, the free ends 19 of the front stays 7 push the front edge of the sunshade 13 and the sunshade 13 is thus slid open by the motor 12 by way of the glass panel 3 and the front stays 7 acting as an intermediary. Closing the sunshade 13 is possible only when the glass panel 13 is closed and is accomplished manually.

The guide rail 6 is additionally provided with another upright portion 6c at the outer most part of guide rail 6 and a flat portion 6b extending between the two upright portions 6a and 6c. The flat lower surface of this guide rail 6 is attached to the upper surface 23 of the sunroof base panel 4 by fastening means which are not shown in the drawings.

The outer most edge of the sunroof base panel 4 is bent upright and defies an outer wall 26. The upper most edge of this outer wall 26 terminates adjacent to an inner roof panel 25 and a seal member 28 is interposed between them. This seal member 28 comprises a main body 29, optionally having a metallic core 31 for reinforcement, which covers the edge of the outer wall 26, a tubular part 33 which elastically abuts the lower surface of an inner roof panel 25, and an extension 35 which extends along the inner surface of the outer wall 26, a horizontal flat surface 4a of the sunroof base panel 4 between the guide rail 6 and the outer wall 26 and the outer surface 6d of the upright portion 6c of the guide rail 6. Thus, a trough 36 is defined by this extension 35. The main body 29 surrounds the upper fringe 27 of the outer wall 26 from both sides and the inner surfaces of the main body 29 of the seal member 28 are provided with a plurality of projections 32 which are inclined upward so that the main body 29 can be easily fitted over the upper fringe 27 of the outer wall 26 but would not be easily come off.

The weather strip 9 is provided with the extension 9a which extends obliquely outwardly and downwardly therefrom while the roof panel 1 and the inner panel 25 are bent downward at their edges adjacent to the opening 2 and joined together, thus forming a depending portion 1a having a slight overhang. Thus, the water which has passed through the seal structure formed by the cooperation of the tubular portion 9b of the weather strip 9 and the depending portion 1a of the roof panel 1 defining the opening 2 is guided either by the extension 9a of the weather strip 9 or the depending portion 1a of the roof panel 1 and drips into the trough 36 defined by the extension 35 of the seal member 28. This seal member 28 may be integrally formed with suitable polymer material by extrusion and the extension 35 may be trimmed as required to accommodate the difference in the height of the outer wall 26 or the width of the trough 36 along the longitudinal direction of the trough 36.

Thus, since the trough 36 is defined by the extension 35 of the seal member 28, there is no need to depress the sunroof base panel 4 as opposed to the prior art. This trough 36, as well as the seal member 28, extends the whole length of the outer periphery of the sunroof base panel 4. Since the extension 35 defining the trough 36 rests upon the side surface 6d of the upright portion 6c of the guide rail 6, the horizontal flat surface 4a of the sunroof base panel 4 and the inner surface 34 of the outer wall 26, the extension 35 is not required to be rigid. As a matter of fact, it is more advantageous if the extension is sufficiently easily deformable so as to accommodate itself in the space defined by the side surface 6d of the upright portion 6c of the guide rail 6, the horizontal flat surface 4a of the sunroof base panel 4 and the inner surface 34 of the outer wall 26.

Figure 3:
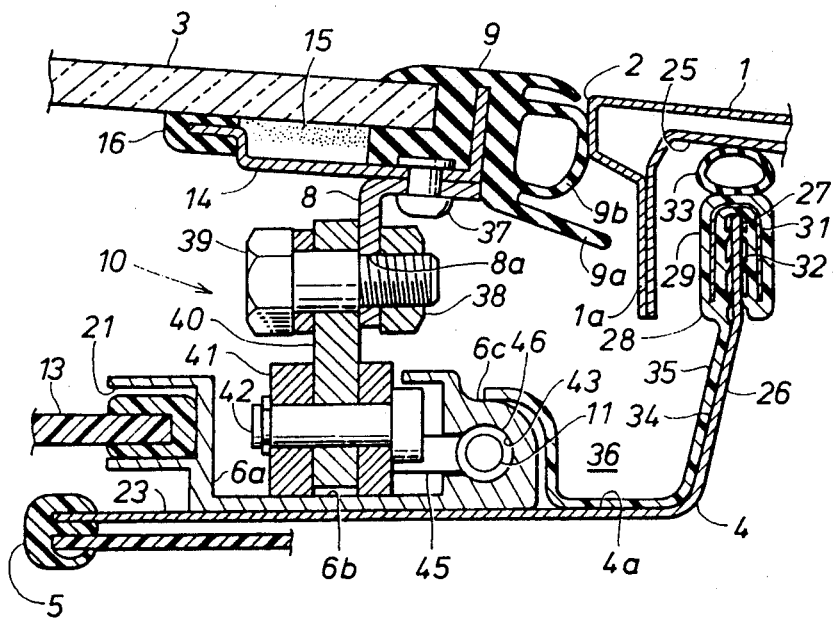
FIG. 3 is a sectional view taken along line III—III of FIG. 1.

FIG. 3 which is a cross sectional view taken along line III—III of FIG. 1 shows the structure of the link mechanism 10 in the vicinity of one of the rear stays 8. This rear stay 8 is L-shaped in cross section and its upper horizontal part is securely attached to the sunroof frame 14 by means of rivets 37. The lower vertical part of the rear stay 8 is provided with a hole 8a and a nut 38 attached to the vertical part coaxially with the hole 8a. An upper end of an elongated link member 40 is pivotally connected to the rear stay 8 by way of a threaded bolt 39 passed though the hole 8a and threaded with the nut 38.

The lower end of the link member 40 is pivotally connected to a clevis member 41 by way of a pin 42 and this clevis member 41 is adapted to slide along the upper surface of the flat portion 6b of the guide rail 6. An arm 45 extends laterally and outwardly from the clevis member 41 and a cylindrical guide member 46 attached to the outer most end of this arm 45 is received in a groove 43 formed in the second upright portion 6c of the guide rail 6. The guide member 46 is attached to an end of the push-pull cable 11.

In this sunroof mechanism, when the motor 12 is driven in a certain direction, the push-pull cable 11 is accordingly driven and the glass panel 3 is caused to close or open the opening 2 by way of the link mechanism 10 and the rear stays 8. The link mechanism 10 is adapted to stow the glass panel 3 in the space defined between the roof panel 1 and the sunroof base panel 4 behind the opening 2. For instance, when the glass panel 3 is in a position other than its fully closed position, the glass panel 3 is located slightly below the roof panel 1 so as to be stowed in the said space behind the opening 2. However, as the glass panel 3 is about to be fully closed, the rear stay 8 rides over a slope which is not shown in the drawings and the glass panel 3 is lifted to a height where the upper surface of the glass panel 3 is substantially flush with the upper surface of the roof panel 1. FIG. 3 shows the glass panel 3 at its fully closed position although the mentioned slope is not shown in the drawing.

Figure 4:
FIG. 4 is a perspective view showing one of the corner portions of the sunroof base panel to which the present invention is applied.

FIG. 4 shows one of the corner portions of the seal member 28. For removal of water which has been received in the trough 36, a drain hose 47 is connected to the extension 35 at its corner portion by way of a tubular member 48 which is bonded at 48a to an opening provided in a relatively low location in the extension 35 and is passed through an opening 49 provided in the sunroof base panel 4. These drain hoses 47 are connected to the four corners of the trough 36 so as to be able to remove water from the trough 36 even when the vehicle is experiencing acceleration or has deviated from its horizontal attitude.

Figure 5:
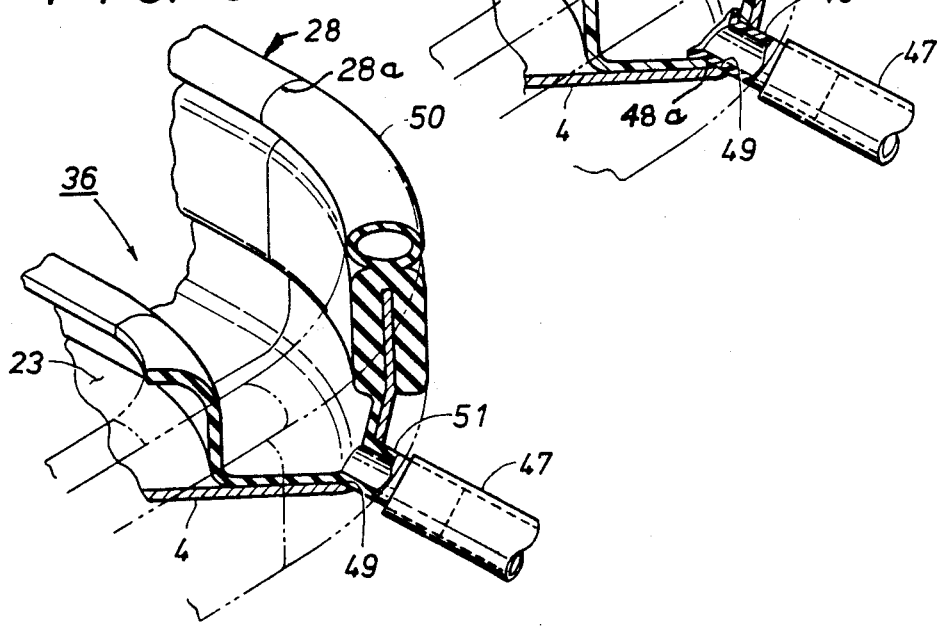
FIG. 5 is a perspective view showing a second embodiment of the present invention.

FIG. 5 shows a second embodiment of the seal member according to the present invention. In this embodiment, a curved corner piece 50 is interposed between adjacent straight spans of the seal member 28 and joined thereto at 28a. This corner piece 50 may be made by a normal molding process as opposed to the straight spans of the seal member 28 which may be more conveniently made by extrusion. This corner piece 50 may be integrally molded with a tubular member 51 which is passed through a hole 49 in the sunroof base panel 4 and over which an end of the drain hose 47 is fitted.

In either case, the water received in the trough 36 is drained from one of the draining hoses 47 without contacting the sunroof base panel 4.

Figure 6:
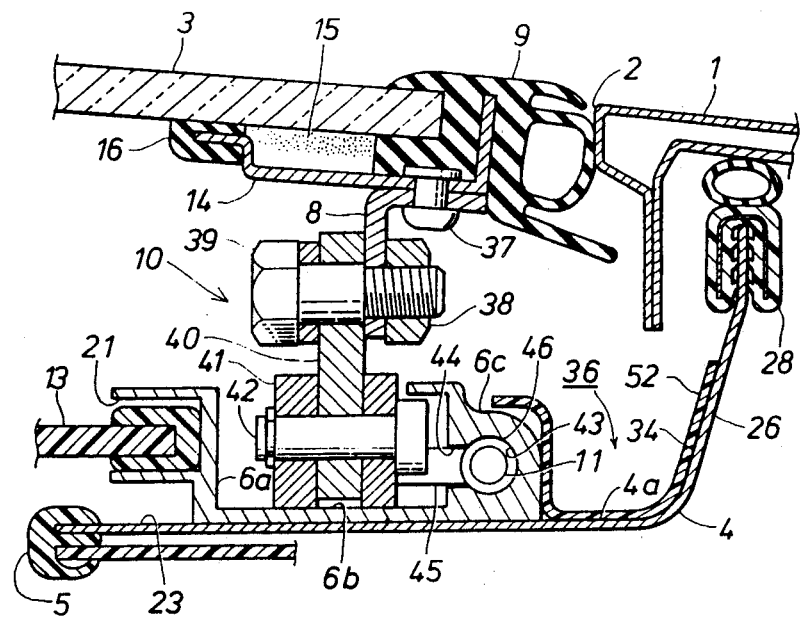
FIG. 6 is a sectional view showing a third embodiment of the present invention.
Figure 7:
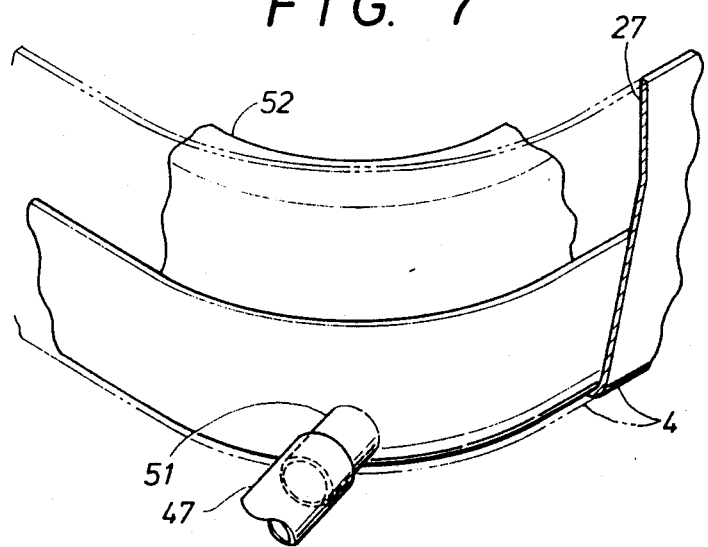
FIG. 7 is a local perspective view showing a fourth embodiment of the present invention.

FIGS. 6 and 7 show a third embodiment of the present invention and the various parts of this embodiment corresponding to those of the preceding embodiments are denoted with like numerals.

In this embodiment, the trough 36 is defined by a separate trough member 52 having a U-shaped cross section instead of being an extension of the seal member 28. This trough member 52 covers the inner surface of the outer wall 26, the upper surface 4a of the sunroof base panel 4 between the guide rail 6 and the outer wall 26 and the outer surface 6d of the upright portion 6c of the guide rail 6, and extends the whole length of the periphery of the opening 2. In a similar manner as the previous embodiments, a drain hose 47 is connected to a tubular member 51 attached to the trough member 52. The material of the trough member 52 is not limited to polymer materials. It is also possible to make the trough material by extruding metal or alloy material.

Figure 8:
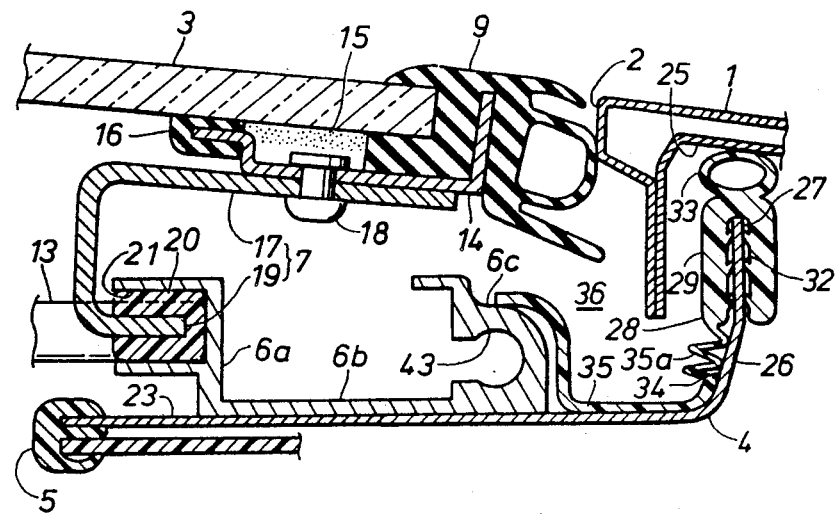
FIGS. 8 and 9 are sectional views similar to FIGS. 2 and 3, respectively, showing different cross sections of a fifth embodiment of the present invention.
Figure 9:
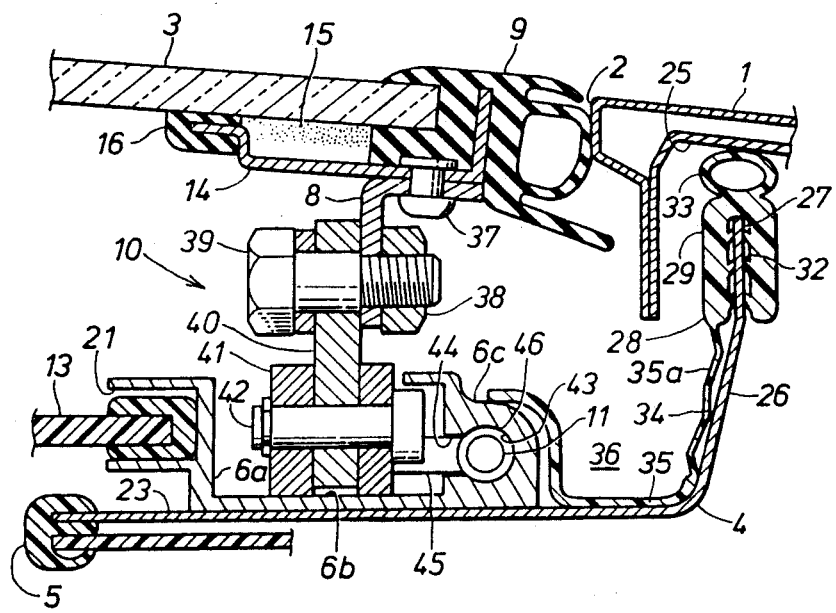

FIGS. 8 and 9 show a fourth embodiment of the present invention in which the extension 35 of the seal member 28 is provided with a pleated portion 35a. According to the present embodiment, even when the height of the outer wall varies (or, alternatively, even when the width of the flat portion 6b varies) along the longitudinal direction of the trough, it can be easily accommodated with since the pleated portion 35a may be broadened or narrowed as desired. Therefore, there is no need to trim the extension 35 even when the width of the extension 35 needs to be adjusted along the longitudinal direction of the trough due to a change in a dimension of the trough which is defined along the inner periphery of the opening 2.

Thus, according to the present invention, since the water drain trough is formed by a member separate from any structural part of the sunroof assembly such as the sunroof base frame, rust prevention of the sunroof assembly is simplified. Furthermore, since there is no need to attach a tube member for connecting a drain hose by brazing or soldering, the manufacturing process is simplified. Further, since the sunroof base frame is not required to be depressed to define the trough, the head clearance of the passenger compartment can be increased without increasing the overall height of the automobile.

Although the present invention has been shown and described with reference to the preferred embodiments thereof, it should not be considered as limited thereby. Various possible modifications and alterations could be conceived of by one skilled in the art to any particular embodiment, without departing from the spirit and the scope of the invention.

What we claim is:

1. In combination, a sunroof structure having an opening provided in a roof panel of an automobile, a sunroof panel which can move between a first position for closing the opening and a second position for exposing the opening, a sunroof base panel supporting a pair of guide rails extending longitudinally of said automobile roof panel along a side periphery of said opening and for achieving the motion of the sunroof panel, and a water drain trough defined along a peripheral region of the opening, wherein the water drain trough comprises a trough liner having a substantially U-shaped cross section extending along a peripheral region of the opening and resting upon an inner surface of a substantially upright outer wall of the sunroof base panel and an outer surface of said guide rails for the sunroof panel.

2. The combination of claim 1, wherein a polymeric seal member is interposed between a lower surface of the roof panel and an upper most edge of the outer wall and the trough liner comprises an extension of the seal member.

3. The combination of claim 2, wherein the extension of the seal member serving as the trough liner is provided with a pleated portion for accommodating a difference in a dimension of the trough liner along the water drain trough.

4. The combination of claim 2, wherein the seal member including the extension thereof is made by extruding polymer material.

5. The combination of claim 2, wherein the seal member comprises straight portions and curved corner portions which are joined together.

6. The combination of claim 5, wherein the corner portions are integrally molded with a tubular member for connecting a drain hole thereto.

7. The combination of claim 3, wherein the seal member including the extension thereof is made by extruding polymer material.

8. The combination of claim 5, wherein each of said curved corner portions has a drain opening for removal of water from said trough liner.

9. The combination of claim 1 wherein said trough liner is a polymeric member.

10. The combination of claim 9 wherein a polymeric peripheral seal member is interposed between a lower surface of said roof panel and an upper most edge of said outer wall of the sunroof base panel above an outer peripheral edge of said trough liner.

* * * * *